US012111046B2

(12) United States Patent
Lumsden et al.

(10) Patent No.: US 12,111,046 B2
(45) Date of Patent: Oct. 8, 2024

(54) TELESCOPIC VEHICLE BARRIER WITH ILLUMINATION STRIP

(71) Applicant: GateArm Technologies, Inc., Port St. Lucie, FL (US)

(72) Inventors: Russel Lumsden, Port St. Lucie, FL (US); Jaikeeshan Sirju, North Lauderdale, FL (US); Bryce C. Fortney, Stuart, FL (US)

(73) Assignee: GateArm Technologies, Inc., Port St. Lucie, FL (US)

( * ) Notice: Subject to any disclaimer, the term of this patent is extended or adjusted under 35 U.S.C. 154(b) by 0 days.

(21) Appl. No.: 18/297,951

(22) Filed: Apr. 10, 2023

(65) Prior Publication Data

US 2023/0332766 A1 Oct. 19, 2023

Related U.S. Application Data

(60) Provisional application No. 63/362,890, filed on Apr. 13, 2022.

(51) Int. Cl.

| | |
|---|---|
| ***F21V 33/00*** | (2006.01) |
| ***E06B 11/02*** | (2006.01) |
| ***F21S 4/28*** | (2016.01) |
| *F21Y 103/10* | (2016.01) |
| *F21Y 115/10* | (2016.01) |

(52) U.S. Cl.

CPC .......... *F21V 33/006* (2013.01); *E06B 11/022* (2013.01); *F21S 4/28* (2016.01); *F21Y 2103/10* (2016.08); *F21Y 2115/10* (2016.08)

(58) Field of Classification Search

CPC ........................... F21Y 2103/10; F21V 33/006

See application file for complete search history.

(56) References Cited

U.S. PATENT DOCUMENTS

| | | | |
|---|---|---|---|
| 1,211,676 | A | 1/1917 | Coleman |
| 3,994,457 | A | 11/1976 | Teasel |
| 4,666,108 | A | 5/1987 | Fox |
| 4,811,516 | A | 3/1989 | Anderson |

(Continued)

FOREIGN PATENT DOCUMENTS

| | | | |
|---|---|---|---|
| DE | 2010008016070 | A1 | 10/2009 |
| EP | 0611040 | | 4/1997 |

(Continued)

OTHER PUBLICATIONS

Innovation Q+ NPL Search (Year: 2024).*

(Continued)

*Primary Examiner* — Anabel Ton

(74) *Attorney, Agent, or Firm* — McHale & Slavin, P.A.

(57) ABSTRACT

A vehicle barrier system employing a first gate arm having a first continuous side wall with a first channel, a second gate arm slidably insertable into the first gate arm having a second channel, and a third gate arm slidably insertable into the second gate arm with a third channel. A fastener secures the extended gate arms to a desired length. Once extended, an LED light strip is placed through the channels. The light strip can be cut to size as necessary, wherein the length of the gate arm and associated light strip can be adjusted on site to a particular length. A controller is used to pivot the gate arm between a horizontal and vertical position to operate as a vehicle barrier.

21 Claims, 16 Drawing Sheets

(56) References Cited

U.S. PATENT DOCUMENTS

| | | | |
|---|---|---|---|
| 6,472,823 | B2 | 10/2002 | Yen |
| 6,487,818 | B1 | 12/2002 | Hamann et al. |
| 6,691,467 | B2 | 2/2004 | Hincher, Sr. |
| 6,860,007 | B1 | 3/2005 | Liu et al. |
| 6,997,417 | B2 | 2/2006 | Zarkades |
| 7,258,461 | B1 | 8/2007 | Izardel |
| 7,258,467 | B2 | 8/2007 | Saccomanno et al. |
| 7,347,606 | B1 | 3/2008 | Patten |
| 7,401,949 | B2 | 7/2008 | Tufte |
| 7,818,920 | B2 | 10/2010 | Causey et al. |
| 8,011,797 | B2 | 9/2011 | Rihl |
| 8,104,920 | B2 | 1/2012 | Dubord |
| 8,231,247 | B2 | 7/2012 | Olmsted |
| 8,845,125 | B1 | 9/2014 | Lumsden et al. |
| 9,157,200 | B2 | 10/2015 | Lumsden |
| 9,273,435 | B2 | 3/2016 | Lumsden et al. |
| 2003/0048641 | A1 | 3/2003 | Alexanderson et al. |
| 2007/0199243 | A1 | 8/2007 | Youn |
| 2008/0038055 | A1 | 2/2008 | Jankovsky |
| 2008/0136661 | A1 | 6/2008 | Pederson et al. |
| 2008/0240854 | A1 | 10/2008 | Binns |
| 2008/0304253 | A1 | 12/2008 | Handsaker |
| 2010/0008090 | A1 | 1/2010 | Li et al. |
| 2010/0091494 | A1 | 4/2010 | Pearson et al. |
| 2018/0156398 | A1* | 6/2018 | Pikman ................. F21V 33/006 |

FOREIGN PATENT DOCUMENTS

| | | | |
|---|---|---|---|
| EP | 2105534 | 9/2009 | |
| EP | 2527536 | 11/2012 | |
| JP | 2003041536 | 2/2003 | |
| JP | 2009245945 A * | 10/2009 | .............. E01F 13/06 |
| KR | 10200887282 | 6/2007 | |
| KR | 100794734 B1 | 1/2008 | |
| KR | 20080110295 | 12/2008 | |
| WO | WO2007030542 | 3/2007 | |

OTHER PUBLICATIONS

*Gatearm Technologies, Inc.* v. *Access Masters, LLC., And Blacksky Technologies, Inc.*, Case No. 0:14-cv-62697-RNS (S.D.FL.).

Supplemental Response to Office Action Ex Parte Reexamination, 90/013,402, Aug. 4, 2015.

Response to Office Action Ex Parte Reexamination, 90/013,402, Apr. 21, 2015.

Rexamination Office Action, 90/013,402, Apr. 21, 2015.

Amano Parking Gates, "AGP-1700 Series Parking Barriers", Product Sheet, Retrieved from Internet Oct. 28, 2014, http://www.amanomcgann.com/product/display/85?categoryid=137, (2012).

Amano Cincinnati AGP-1700 Parking Gate, Tsci, Spec Sheet, Retrieved from Internet Oct. 28, 2014, http://www.amanomcgann.com, (Nov. 22, 2011).

Amano McGann Parking Solutions, "APG-1700 Series Parking Gate", Company Brochure Spec Sheet, Retrieved from Internet Oct. 28, 2014, http://www.amanomcgann.com, (2011).

4404U003, Office Action, 04102015.

* cited by examiner

TELESCOPIC VEHICLE BARRIER WITH ILLUMINATION STRIP

PRIORITY CLAIM

In accordance with 37 C.F.R. § 1.76, a claim of priority is included in an Application Data Sheet filed concurrently herewith. Accordingly, the present invention claims priority to U.S. Provisional Patent Application No. 63/362,890, entitled "EXPANDABLE VEHICLE BARRIER WITH ILLUMINATION STRIP", filed Apr. 13, 2022. The above referenced application is incorporated herein by reference.

FIELD OF THE INVENTION

The present invention relates generally to vehicle barrier systems and, in particular, to an illuminated gate arm with telescopic extensions that facilitates storage, shipping and installation.

BACKGROUND OF THE INVENTION

Traffic or vehicle barriers are used to provide controlled access of vehicle traffic to restricted areas, such as private "gated" communities, parking lots, parking garages, loading docks, and controlling the flow of traffic on roads, and so forth. Of primary concern is the use of a gate arm that is maintained in a horizontal position to impede vehicle passage and operatively pivoted into a vertical position to allow vehicle passage. For instance, gated communities use a gate arm to stop unauthorized access to the community. Gate arms consist of an arm made of wood or aluminum and are easily recognized during the day, as compared to at night. For distance viewing, the gate arm may include a bright color scheme and/or reflective tape. The reflective tape or bright color scheme tends to fade over time and is often covered with debris, causing limited visibility at night.

To address the limitations of visibility, gate arms include a lighting assembly attached to the gate arm. Modern lighting assemblies employ a gate arm formed from a lightweight elongated piece of aluminum material having a control system to selectively pivot the gate arm between a horizontal position and a vertical position. The aluminum material is extruded to include an inset channel for receipt of a removable LED light strip. Recognized modern extruded aluminum gate arms having an inset channel are disclosed in U.S. Pat. Nos. 8,845,125; 9,157,200; and 9,273,435.

Gate arms are extruded in different lengths. For instance, a narrow roadway entrance may use a 7 ft. long gate arm. A wider roadway may use a 17 ft. long gate arm or any length therebetween. Shipping a 7 ft. long gate arm is cost effective and manageable. Shipping a 17 ft. long gate arm requires a special carrier and is extremely expensive, with the cost of shipping typically costing more than the gate arm. The companies capable of transporting long items are more difficult to engage, as a long gate arm consumes a large floor space.

While a modern aluminum extruded gate arm is strong, it is not indestructible. Impacting the gate arm at the wrong place can result in damaging the cosmetic appearance. For this reason, the gate arm may be wrapped in shipping material. Further, if the impact is severe, the gate arm could be bent. If such a possibility exists, then the gate arm would be placed in a crate capable of protecting the gate arm.

Unique to this invention is the nesting of multiple gate arms wherein storage and shipping of the gate arms is reduced to the size of a single gate arm. The problem with the prior art, to which this invention addresses, is that the storage and shipping of gate arms over 8 ft. in length limits the carriers capable of transporting the arms, and exponentially increases the cost of storage and shipping. For instance, a 17 ft. gate arm must be properly crated to avoid damage during storage and shipping. The length is unwieldy to move and even though a long gate arm is light, it is not something a sole individual can be entrusted to carry without risking damage to the gate arm or surrounding area, or to the individual. The crating of the gate arm adds weight and bulk, wherein multiple individuals or a lift truck may be needed to move the gate arm. Further, fixed length gate arms must be sized for the opening. For instance, a roadway can easily range from 7 ft. wide to 17 ft. wide. An installer may have to cut a gate arm during installation to meet the opening. However, cutting of the gate arm can result in sharp edges or expedite corrosion. For example, an installer having a 15 ft. opening needs to either order that length or cut a longer length to size. If the gate arm is constructed from anodized aluminum, cutting of the gate arm exposes the metal. Further, the cut will need to be deburred after the cut to avoid sharp edges.

What is lacking in the art is a gate arm that is telescopic from 7 ft. to at least 15 ft., and can be transported by any shipping company.

SUMMARY OF THE INVENTION

The present invention overcomes the deficiencies of the known art and the problems that remain unsolved by providing a gate arm that can be stored and shipped in a first length, and expanded to a length as needed upon installation. In a preferred embodiment, the base gate arm is 7 ft. long having a first extension insert sufficient to add 5 ft. of length to the base gate arm, and a second telescopic insert sufficient to add another 5 ft. of length to the base gate arm, to obtain an overall length of 17 ft. The telescopic gate arm employs a controller adapted to pivot the gate arm between a horizontal position and a vertical position to control the flow of vehicle traffic. The gate arm and individual telescopic arms include inset channels for removeably receiving an array of LED lights to increase visibility and alert drivers or pedestrians to the presence of the gate arm at night.

In accordance with one implementation of the present invention, there is provided a vehicle barrier system comprising: a first gate arm having a first continuous side wall forming a cavity therein, the first side wall including a first elongated inset channel having an opening formed along a longitudinal axis of the first gate arm; a second gate arm having a second continuous side wall slidably insertable into the first cavity of the first gate arm, the second continuous side wall forming a second cavity therein, the second side wall including a second elongated inset channel having an opening formed along a longitudinal axis of the second gate arm; a third gate arm having a third continuous side wall slidably insertable into the second cavity of the second gate arm, the third side wall including a second elongated inset channel having an opening formed along a longitudinal axis of the second gate arm; and a light strip removably retained within the elongated inset channel of the first, second and third gate arms such that light from the light strip is visible through the inset channel. The light strip can be cut to size as necessary wherein the length of the gate arm can be adjusted on site to a particular length.

An objective of the invention is to provide an telescopic lighted gate arm, namely a gate arm that can expand in length from 7 ft. to 17 ft., wherein an installer may customize the length to meet a particular installation limitation.

Yet another objective of the invention is to teach the use of nesting gate arms to minimize storage requirements and shipping costs, wherein a first gate arm forms a cavity for receipt of a second gate arm, and the second gate arm forms a cavity for receipt of a third gate arm.

Yet still another objective of the invention is to provide a light strip formed from a plurality of light emitting diodes, each electrically connected in parallel, encased within a protective member, for slidable insertion through slots in adjoining gate arms to provide continuity between gate arm inset channels.

Another objective is to provide an octagon gate arm having a front surface and rear surface on each side of an inset channel for receipt of a reflective tape or coating.

Yet still another objective of the invention is to employ spacing tabs to allow ease of gate arm insertion and removal from a cavity while protecting the tape or coating placed on the inset channel top surface.

Another objective of the invention is to provide an inset channel guarded by at least one terminating end to assist in retaining of a light strip.

Still another objective of the invention is to provide a collapsible gate arm assembly that can be stored in a smaller length for less wind exposure during high winds, such as hurricanes.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Detailed embodiments of the instant invention are disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure. The present invention is directed to a vehicle barrier system comprising an telescopic gate arm 10 for use in providing controlled access of vehicle traffic in particular designated areas including, but not limited to, parking lots, parking garages, loading docks, highways, military bases, airports, roadways, or the like. It will be understood that the barrier system 10 of the present invention may be modified slightly to provide a barrier system for use in providing controlled access of individuals or pedestrian traffic in or out of various designated areas including, but not limited to, buildings, walkways, bridges, tunnels, or other areas where controlled access to individuals is contemplated.

Figure 1A:
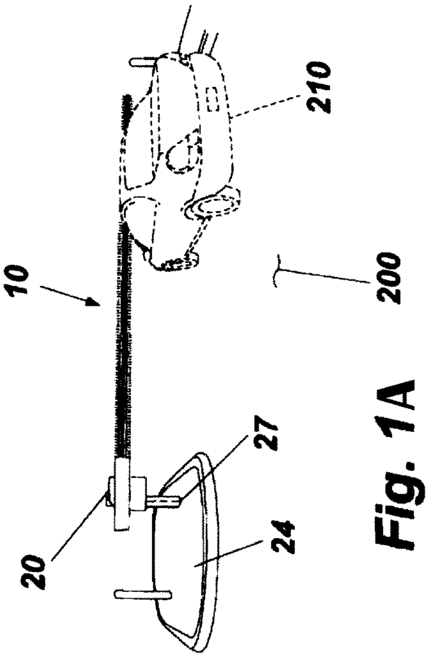
FIG. 1A is a perspective pictorial view of the telescopic gate arm, depicting the gate arm in a horizontal position.
Figure 1B:
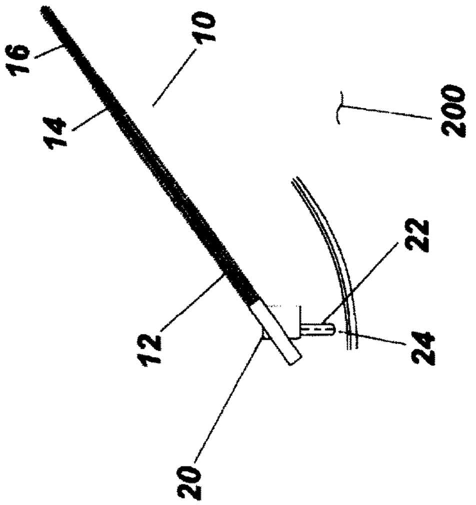
FIG. 1B is a perspective pictorial view of the telescopic gate arm depicting the gate arm in a vertical position.
Figure 2:
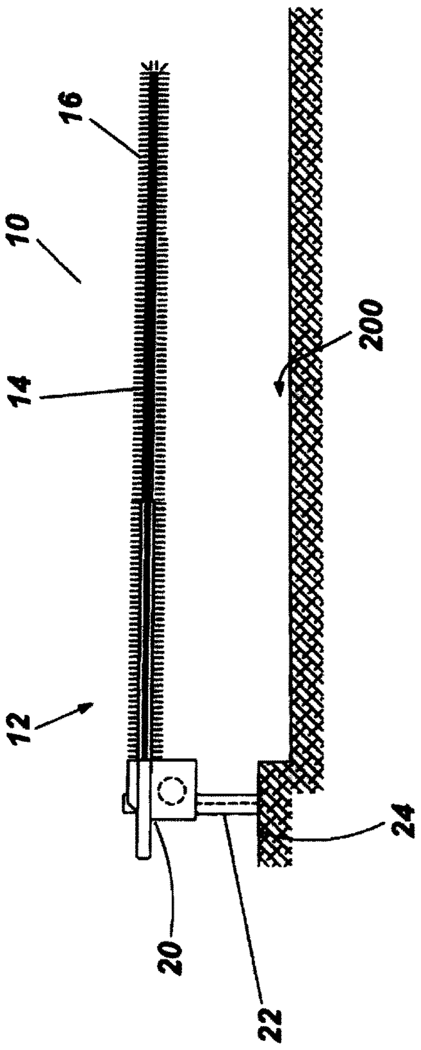
FIG. 2 is a front pictorial view of the telescopic gate arm, depicting the individual sections of the gate arm.

With reference made to FIGS. 1A-1B and 2, the telescopic gate arm 10 of the instant invention consists of a base arm 12, an extension arm 14, and an end arm 16. The telescopic gate arm 10 is deployed along a designated roadway 200 to facilitate controlled access of vehicles 210 in restricted areas, such as gated communities. Control of the telescopic gate arm 10 includes a controller 20 that allows the movement of the telescopic gate arm 10 to pivot between a guarded position as depicted in FIGS. 1A-1B, and an unguarded position as depicted in FIG. 2, thereby limiting the passage of vehicles 210 to enter or exit the private area while the gate arm 10 is in the horizontal guarded position. The controller 20 is secured to a post 22, which in turn is mounted to the ground using a cement foundation 24. For installation purposes, the height of the mounting post 22 is selected to align the telescopic gate arm 10 above the surface of the roadway 200, such that the gate arm 10 spans the width of the roadway 200 to prevent passage of vehicles when the gate arm 10 is in the horizontal guarded position.

The controller 20 is used to pivot the telescopic gate arm 10 from the horizontal guarded position to a vertical unguarded position to control traffic through a roadway. The controller 20 is well known in the art, and consists of an electrical motor coupled to a gearing system, such as a variable frequency drive, to operate the speed and torque of the motor. Alternatively, a control system may include a pneumatic system or hydraulic system including an air compressor, a hydraulic pump, fluid motors, pneumatic or hydraulic cylinders, electrical limit switches, valves, filters, couplings, regulators, and hoses or pipes, where such components are operatively coupled together to control the pivoting movement of the telescopic gate arm. In yet another embodiment, the telescopic gate arm may include a spring-balanced system, not shown, wherein a spring tension holds the security gate arm in an upright vertical position, until pushed downwardly by force. An internal spring counter balancing weight may be included to allow easy lifting and lowering of the gate arm.

In accordance with the instant invention, the telescopic vehicle barrier gate arm comprises gate arm constructed of aluminum, namely a first gate arm portion defined by an exterior wall having a length, said exterior wall having an outer surface and an inner surface, said first gate arm portion having an internal space defined by said inner surface of said exterior wall, said first gate arm portion having at least one light-retaining channel extending along said length, said at least one light-retaining channel extending inwardly from said exterior wall, said at least one light-retaining channel having a height and configured to receive a light strip, said at least one light-retaining channel including at least one light-retaining wall extending only partially said height of said light-retaining channel; a second gate arm portion defined by an exterior wall having a length, said exterior wall having an outer surface and an inner surface, said second gate arm portion having internal space defined by said inner surface of said exterior wall, said second gate arm portion having an at least one light-retaining channel extending along said length, said at least one light-retaining channel extending inwardly from said exterior wall, said at least one light-retaining channel having a height and configured to receive a light strip, said at least one light-retaining channel including at least one light-retaining wall extending only partially said height of said light-retaining channel; said second gate arm portion sized to fit within said internal space of said first gate arm portion; a proximal end of said second gate arm portion including an attachment portion on said exterior wall of said second gate arm portion; a distal end of said first gate arm portion including an attachment portion on said exterior wall of said first gate arm portion; and a light strip which is removably retained within said light retaining channel such that light from said light strip is visible through said light retaining channel.

Figure 3:
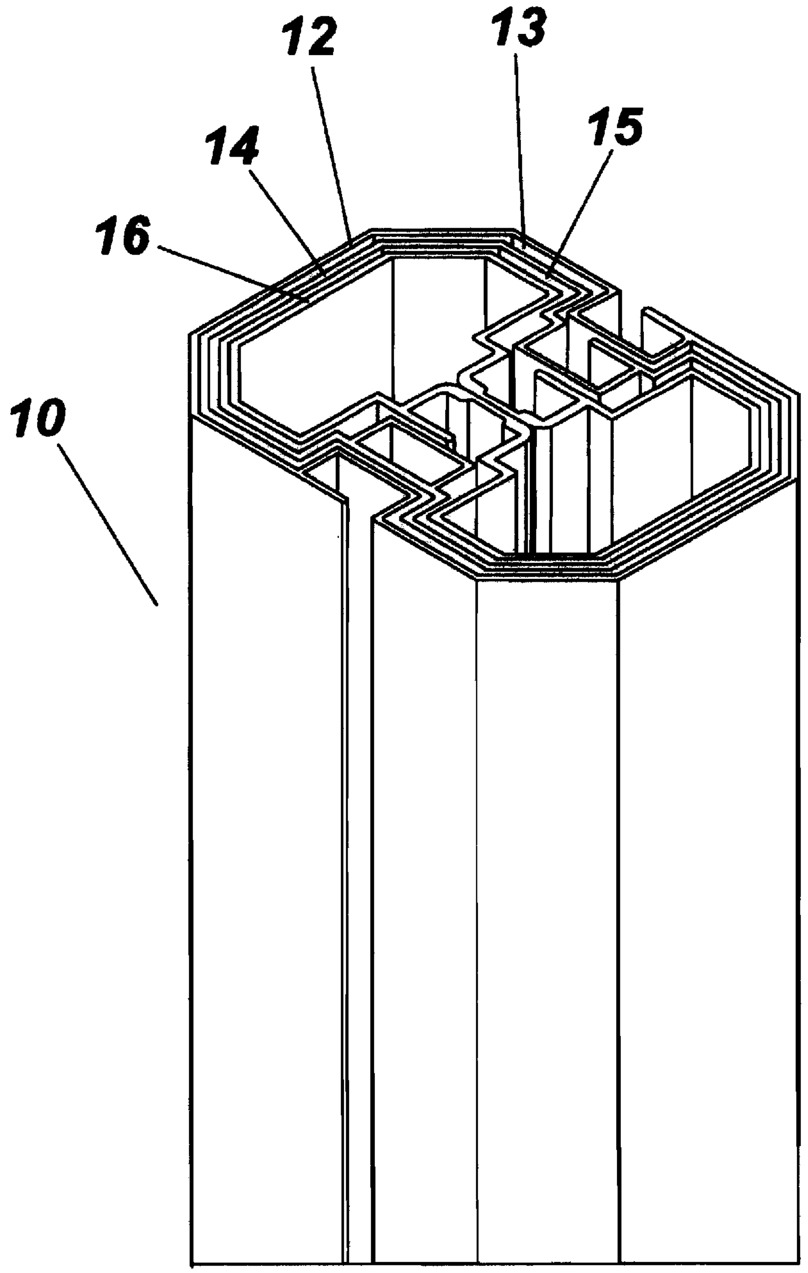
FIG. 3 is a perspective end view of a nested telescopic gate arm consisting of a base arm, an extension arm, and an end arm.

Referring to FIG. 3, illustrated is an end view of the telescopic gate arm assembly 10 in a storage position comprising a base gate arm 12 having a base arm cavity 13, with an extension gate arm 14 inserted in the base arm cavity 13. The extension gate arm 14 forms an extension arm cavity 15 with an end arm 16 inserted into the extension arm cavity 15. The gate arm assembly 10 uses a majority of the cavity for each arm, thereby optimizing space utilization to eliminate oversize storage and shipping charges.

Figure 4:
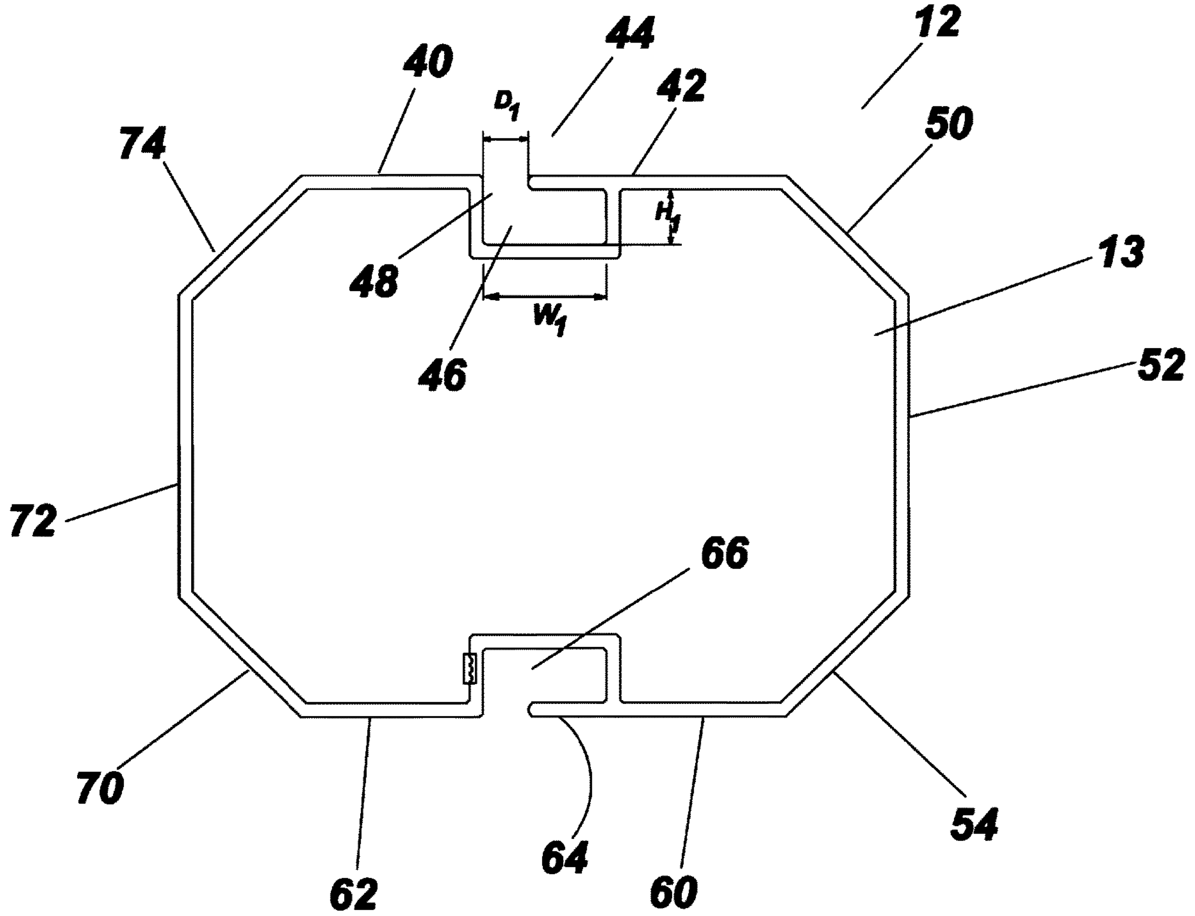
FIG. 4 a cross-sectional view of the base arm.

Referring to FIG. 4, illustrated is the base gate arm 12 having a preferred length of about 7 ft. It is noted that most shipping company have a shipping length limitation of 8 ft., wherein the base gate arm 12 and any controller bracket attached to it would be less than the shipping limitations. The base gate arm 12 is defined by a first front wall 40 separated from a second front wall 42 by a front inset channel 44; the front inset channel 44 having a light-retaining channel 46 with a width W1 of about 0.5 inches and a height H1 of about 0.23 inches with an opening 48 having a spacing D1 of about 0.188 inches. A light strip 150 is constructed and arranged to be placed into the light-retaining channel 46 through the opening 48. A first chamfer wall 50 is angled 45 degrees from the second front wall 42 to a first side wall 52. A second chamfer wall 54 is angled 45 degrees from the first side wall 52 to a first rear wall 60, and separated from a second rear wall 62 by a rear inset channel 64. The rear inset channel 64 forms a mirror image of the front inset chamber, having a light-retaining channel 66 with an opening 68. A third chamfer wall 70 is angled 45 degrees from the second rear wall 62 to a second side wall 72. A fourth chamfer wall 74 is angled 45 degrees from the second side wall 72 to the first front wall 40.

Figure 5:
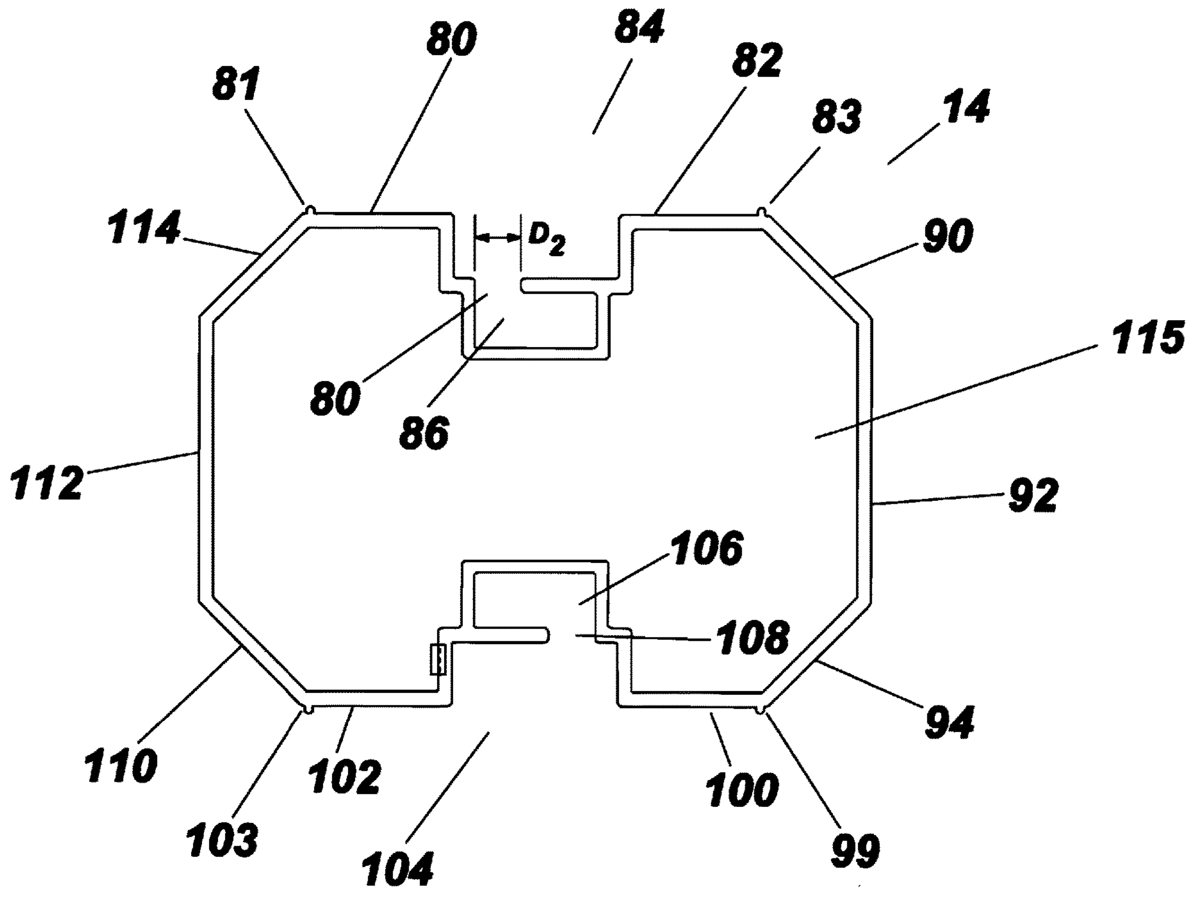
FIG. 5 is a cross-sectional view of the extension arm.

Referring to FIG. 5, illustrated is the extension gate arm 14 having a length of about 7 ft., which is slidably insertable into the cavity 13 of the base gate arm 12. In the preferred embodiment, the extension gate arm 14 can be extended up to 5 ft. from the end of the base gate arm 12, wherein two feet of the extension gate arm remains within the base gate arm 12 for a proper foundation. The extension gate arm 14 is defined by a first front wall 80 separated from a second front wall 82 by a front inset channel 84; the front inset channel 84 having a light-retaining channel 86 with a width W2 of about 0.5 inches and a height H2 of about 0.23 inches with an opening 88 having a spacing D2 of about 0.188 inches. A first chamfer wall 90 is angled 45 degrees from the second front wall 82 to a first side wall 92. A second chamfer wall 94 is angled 45 degrees from the first side wall 92 to a first rear wall 100, which is separated from a second rear wall 102 by a rear inset channel 104; the rear inset channel 104 forming a mirror image of the front inset channel having a light-retaining channel 106 with an opening 108. A third chamfer wall 110 is angled 45 degrees from the second rear wall 102 to a second side wall 112. A fourth chamfer wall 114 is angled 45 degrees from the second side wall 112 to the first front wall 80. A first spacer tab 81 is positioned on the outer edge of the first front wall 80; a second spacer tab 83 is positioned on the outer edge of the second front wall 82. Similarly, a third spacer tab 99 is positioned on the outer edge of the first rear wall 100, and a fourth spacer tab 103 is positioned on the outer edge of the second rear wall 102. The spacer tabs are positioned along the extension arm 14 to slide within the base arm 12, so as to center the extension arm 14 in relation to the inner surface of the base arm 12. The centering of the extension arm 14 protects the outer surfaces of the arm from scratching during storage, shipping and installation. This allows the factory placement of reflective tape or paint on the first and second front walls 80, 82 and first and second rear walls 100, 102.

Figure 6:
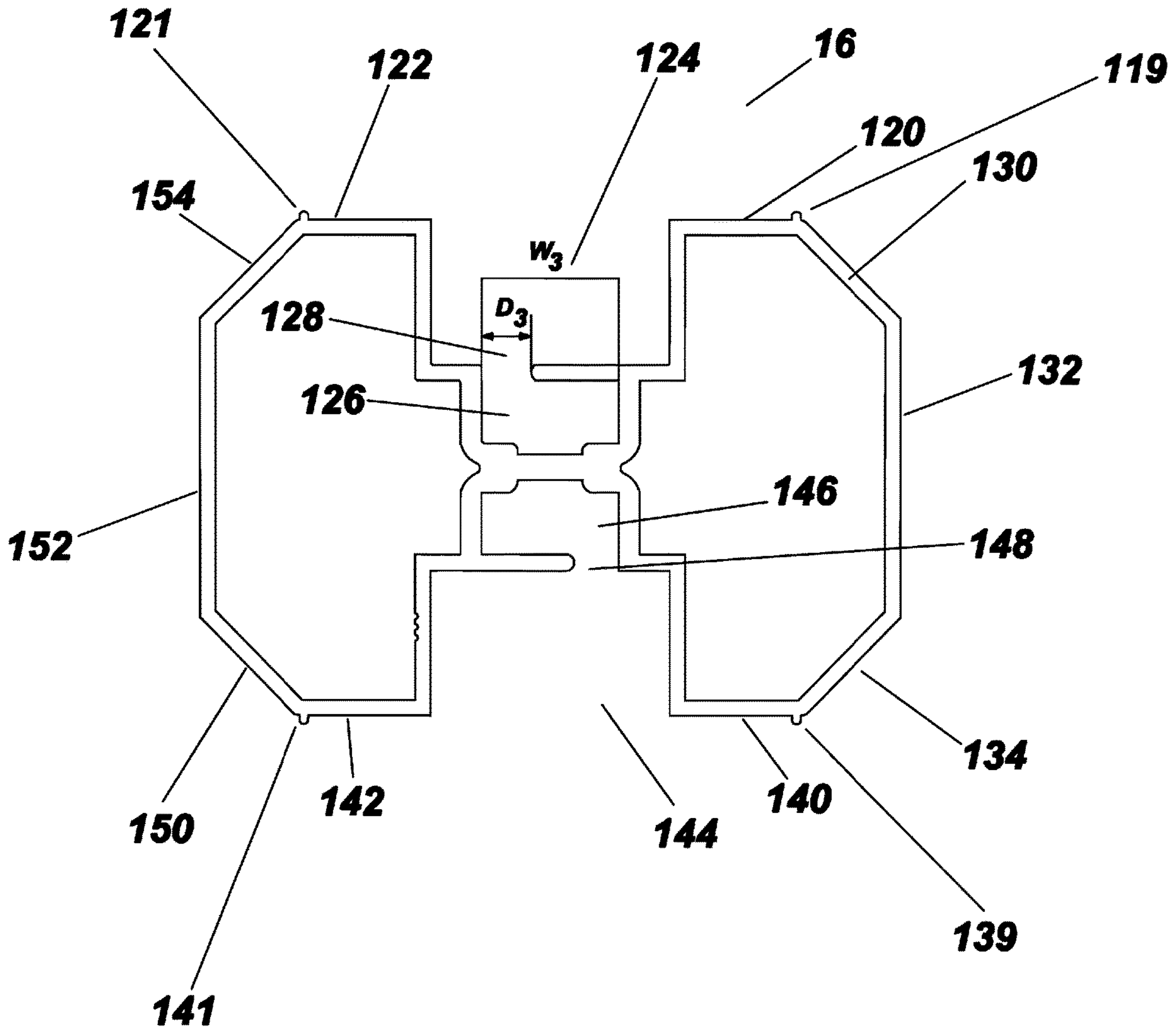
FIG. 6 is a cross-sectional view of the end arm.

Referring to FIG. 6, illustrated is the end gate arm 16 having a length of about 7 ft., which is slidably insertable into the cavity 15 of the base gate arm 14. In the preferred embodiment, the end gate arm 16 can be extended up to 5 ft. from the end of the extension gate arm 14, wherein two feet of the end gate arm 16 remains within the extension gate arm 14 for a proper foundation. The end gate arm 16 is defined by a first front wall 120 separated from a second front wall 122 by a front inset channel 124; the front inset channel 124 having a light-retaining channel 126 with a width W3 of about 0.5 inches and a height H3 of about 0.23 inches with an opening 128 having a spacing D3 of about 0.188 inches. A first chamfer wall 130 is angled 45 degrees from the first front wall 120 to a first side wall 132. A second chamfer wall 134 is angled 45 degrees from the first side wall 132 to a first rear wall 140, which is separated from a second rear wall 142 by a rear inset channel 144; the rear inset channel 144 forming a mirror image of the front inset channel 124, and having a light-retaining channel 146 with an opening 148. A third chamfer wall 150 is angled 45 degrees from the second rear wall 142 to a second side wall 152. A fourth chamfer wall 154 is angled 45 degrees from the second side wall 152 to the first front wall 122.

Similar to the extension arm 14, a first spacer tab 119 is positioned on the outer edge of the first front wall 120 of the end arm 16; a second spacer tab 121 is positioned on the outer edge of the second front wall 122. A third spacer tab 139 is positioned on the outer edge of the first rear wall 140, and a fourth spacer tab 141 is positioned on the outer edge of the second rear wall 142. The spacer tabs positioned along the end arm 16 are constructed and arranged to slide within the extension arm 14 so as to center the end arm 16 in relation to the inner surface of the extension arm 14. The centering of the extension arm 14 protects the outer surfaces of the arm from scratching during storage, shipping and installation. This allows the factory placement of reflective tape or paint on the first and second front walls 120, 122, and the first and second rear walls 139, 141.

Figure 7:
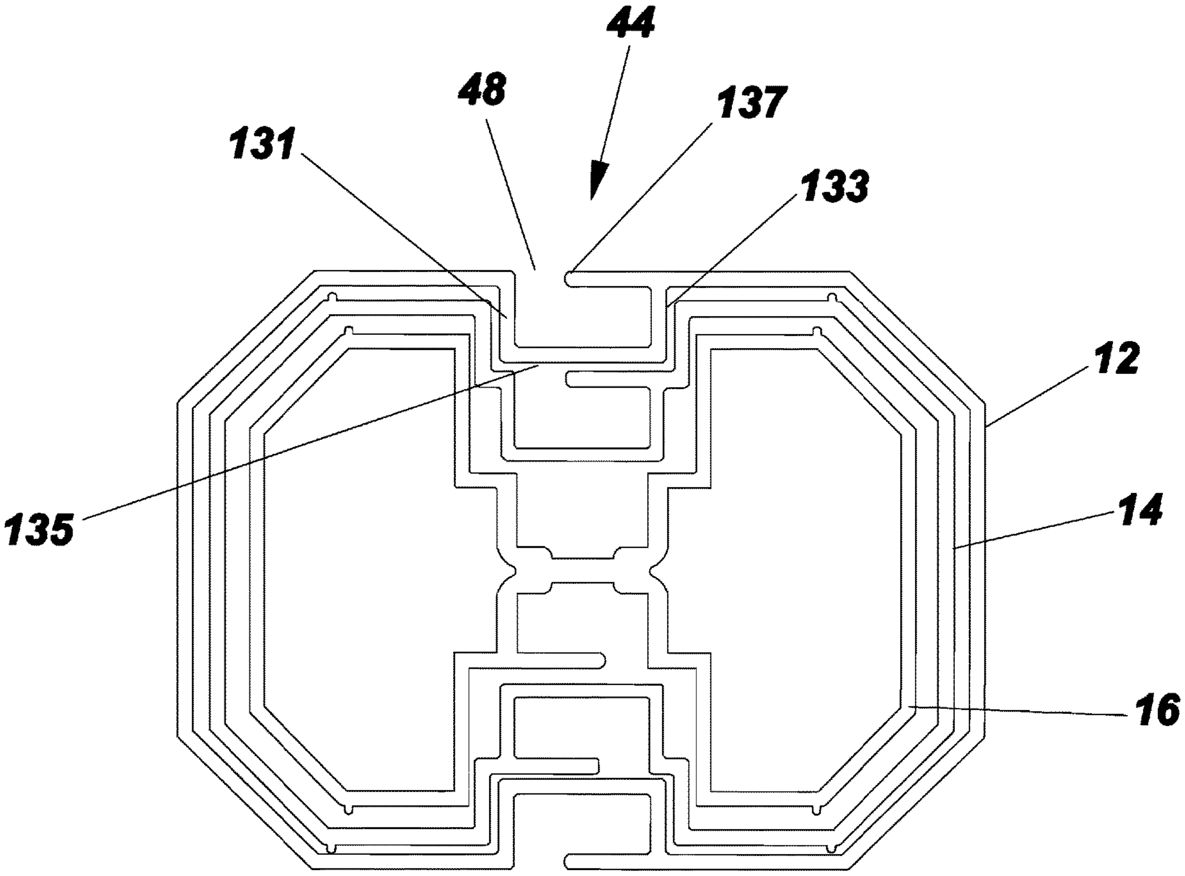
FIG. 7 is an end view of the nested gate arms.

Referring to FIG. 7, illustrated is an elongated inset channel 44 having an opening 48 formed by a pair of inset channel sidewalls 131, 133 integrally joined to a channel backwall 135. The inset channel walls 131, 133, including at least one terminating end 137 spaced from a sidewall 133 to form the opening 48. For ease of drawing readability, a single inset channel has been numbered, but it will be understood that all the inset channels for each arm are uniform. It is further noted that the terminating end 137 may extend from side wall 131, or extend from both channel sidewalls 131 and 133. For rigidity purposes, the backwall 147 of the end arm 16 operates for the front inset channel 124 and the rear inset channel 144.

Figure 8:
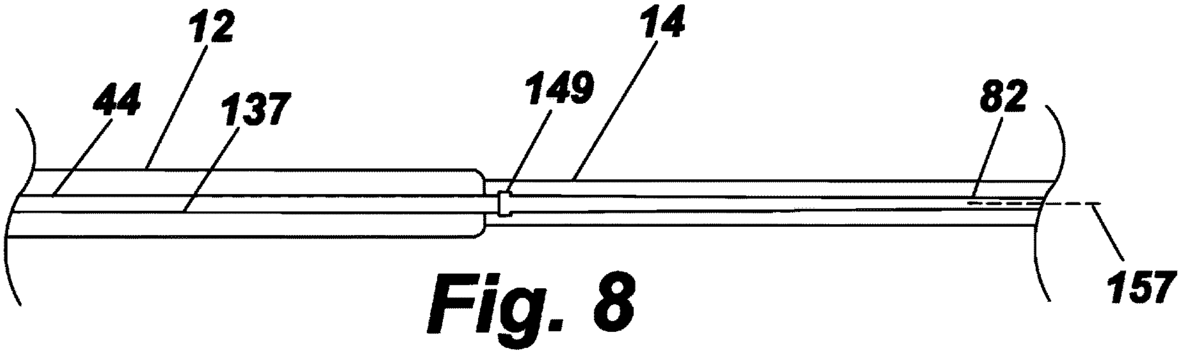
FIG. 8 is a top view of the gate arms without a light strip.
Figure 10:
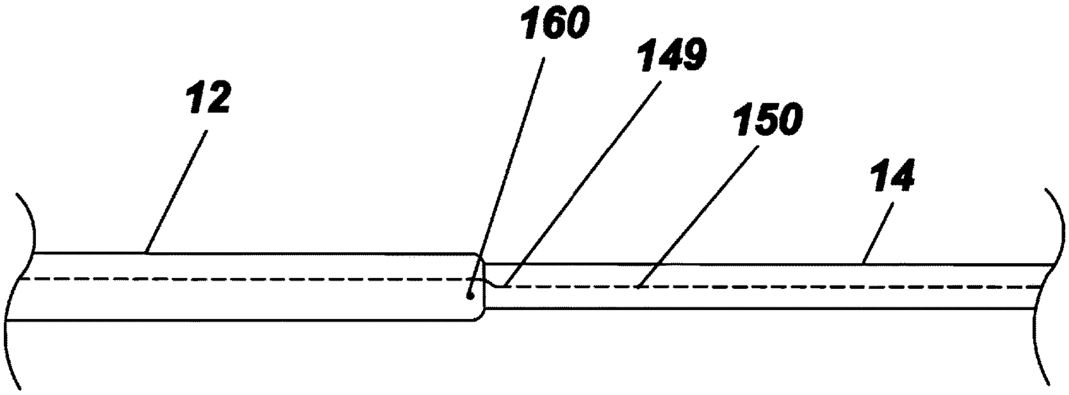
FIG. 10 is a side view of the gate arms with a light strip.
Figure 9:
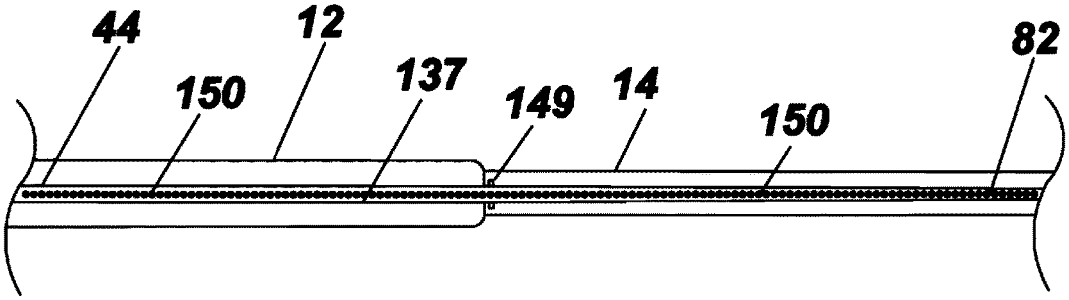
FIG. 9 is a top view of the gate arms with a light strip.

Referring to FIGS. 8-10, depicted are the base arm 12 and extension arm 14 having inset channels 44, 82 shown along axis 157). A slot 149 is placed along the inset channel 82 of the extension arm 14; similarly, an identical slot 149 is placed along the inset channel 124 of the end arm 16. For ease of drawing description, it is noted that the slots may be placed anywhere along the length of the arm 14, 16 as well as on the rear facing inset channels. The slots allow the placement of a strip of light emitting diodes 150 to be inserted within an inset channel, wherein the LED strip 150 is cradled within the channel sidewalls of the inset channel. The terminating end of each inset channel retains the LED strip within the inset channel, thus eliminating the need for fasteners and allowing quick and easy installation or removal of the LED strip 150. The LED strip 150 is positioned within each inset channel such that light, illuminated from the light emitting diodes, passes through the opening of the inset channel.

In a preferred embodiment, the LED strip 150 is preferably enclosed within a protective enclosure or shock absorbing protective substrate. The protective substrate may comprise any of a transparent rubber, a clear hardened gel material, a clear epoxy, a clear vinyl, or a clear resin material. In one embodiment, each of the plurality of light emitting diodes 150 comprises the same color; however, each of the light emitting diodes 150 may comprise multiple sets of different colors, where a number of light emitting diodes comprise one color, and an N number of light emitting diodes comprise another color. This allows illumination of a red color when the gate arm is in a horizontal position, and a green color when the gate arm is in a vertical position. In a preferred embodiment, the light emitting diodes are coupled to a high-intensity LED flasher unit capable of outputting a luminescence at about 60 flashes per minute.

A fastener 160 is used to fix the extended length of the gate arms. The fastener 160 can be a screw or, more preferably a spring loaded detent, wherein the extension arm 14 and end arm 16 can be adjusted to a particular length. It should be noted that the fastener 160 will allow the extension arm 14 and end arm 16 to be reinserted into the base arm 12. This would protect the gate arm during high winds such as hurricanes.

Figure 11:
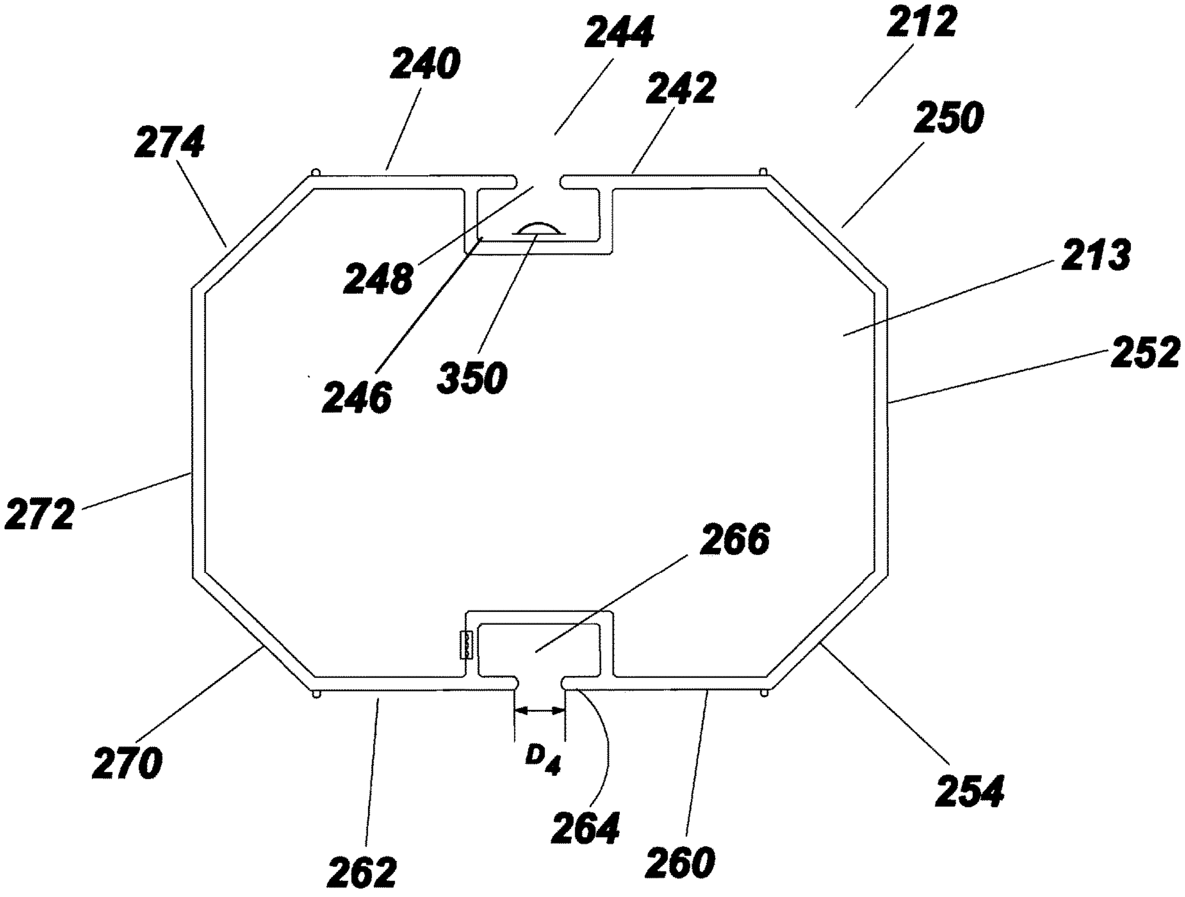
FIG. 11 a cross-sectional view of the base arm with a first alternative embodiment.

Referring to FIG. 11, set forth an alternative embodiment wherein a base gate arm 212 is defined by a first front wall 240 separated from a second front wall 242 by a front inset channel 244; the front inset channel 244 having a light-retaining channel 246 with a width of about 0.5 inches and a height of about 0.23 inches with an opening 248 having a spacing of about 0.188 inches similar to the first embodiment with the opening 248 centralized. A light strip 350 is constructed and arranged to be placed into the light-retaining channel 246 through the opening 248. A first chamfer wall 250 is angled 45 degrees from the second front wall 242 to a first side wall 252. A second chamfer wall 254 is angled 45 degrees from the first side wall 252 to a first rear wall 260, and separated from a second rear wall 262 by a rear inset channel 264. The rear inset channel 264 forms a mirror image of the front inset chamber, having a light-retaining channel 266 with an opening 268. A third chamfer wall 270 is angled 45 degrees from the second rear wall 262 to a second side wall 272. A fourth chamfer wall 274 is angled 45 degrees from the second side wall 272 to the first front wall 240.

Figure 12:
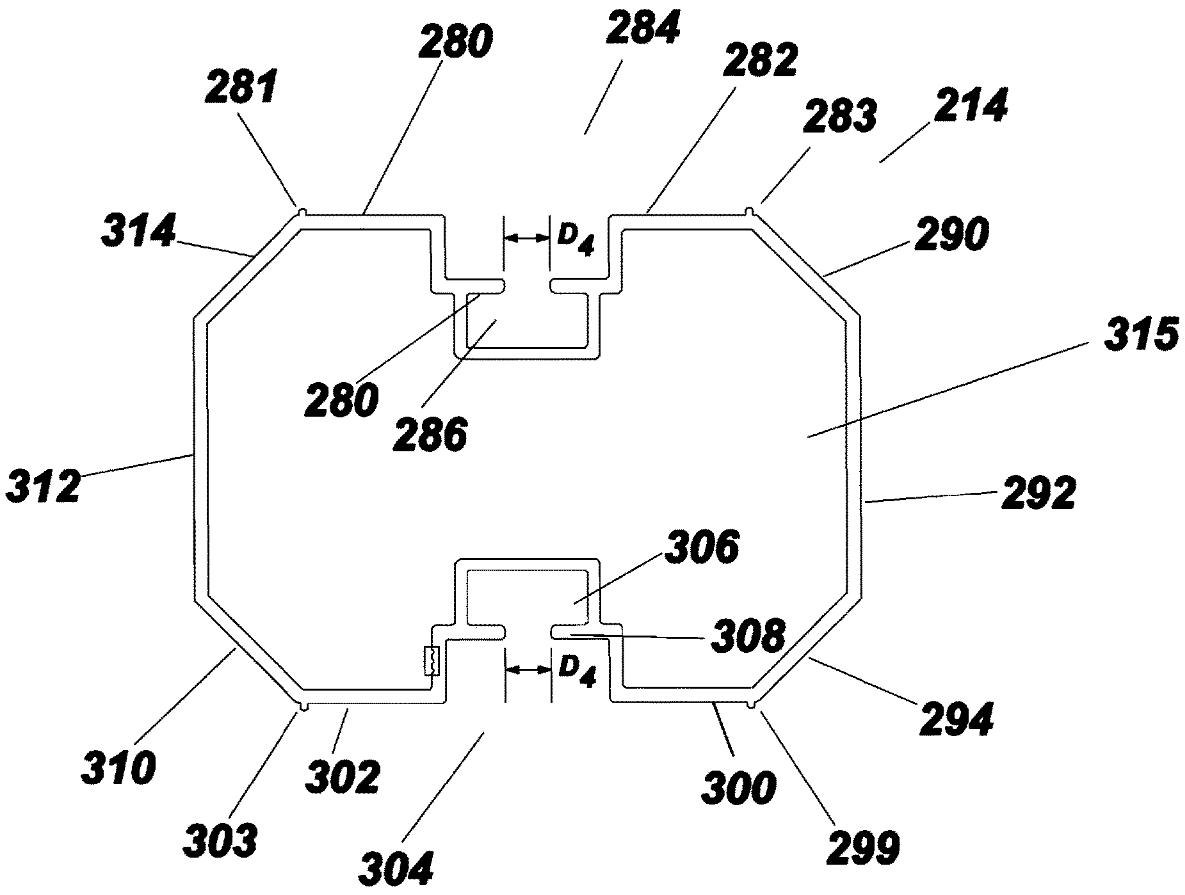
FIG. 12 is a cross-sectional view of the extension arm the first alternative embodiment.

Referring to FIG. 12, illustrated is the extension gate arm 214 having a length of about 7 ft., which is slidably insertable into the cavity 213 of the base gate arm 212. In the preferred embodiment, the extension gate arm 214 can be extended up to 5 ft. from the end of the base gate arm 212, wherein two feet of the extension gate arm remains within the base gate arm 212 for a proper foundation. The extension gate arm 214 is defined by a first front wall 280 separated from a second front wall 282 by a front inset channel 284; the front inset channel 284 having a light-retaining channel 286 with a width of about 0.5 inches and a height of about 0.23 inches with an opening 288 having a spacing of about 0.188 inches. A first chamfer wall 290 is angled 45 degrees from the second front wall 282 to a first side wall 292. A second chamfer wall 294 is angled 45 degrees from the first side wall 292 to a first rear wall 300, which is separated from a second rear wall 302 by a rear inset channel 304; the rear inset channel 304 forming a mirror image of the front inset channel having a light-retaining channel 306 with an opening 308. A third chamfer wall 310 is angled 45 degrees from the second rear wall 302 to a second side wall 312. A fourth chamfer wall 314 is angled 45 degrees from the second side wall 312 to the first front wall 280. A first spacer tab 281 is positioned on the outer edge of the first front wall 280; a second spacer tab 283 is positioned on the outer edge of the second front wall 282. Similarly, a third spacer tab 299 is positioned on the outer edge of the first rear wall 300, and a fourth spacer tab 303 is positioned on the outer edge of the second rear wall 302. The spacer tabs are positioned along the extension arm 214 to slide within the base arm 212, so as to center the extension arm 214 in relation to the inner surface of the base arm 212. The centering of the extension arm 214 protects the outer surfaces of the arm from scratching during storage, shipping and installation. This allows the factory placement of reflective tape or paint on the first and second front walls 280, 282 and first and second rear walls 300, 302.

Figure 13:
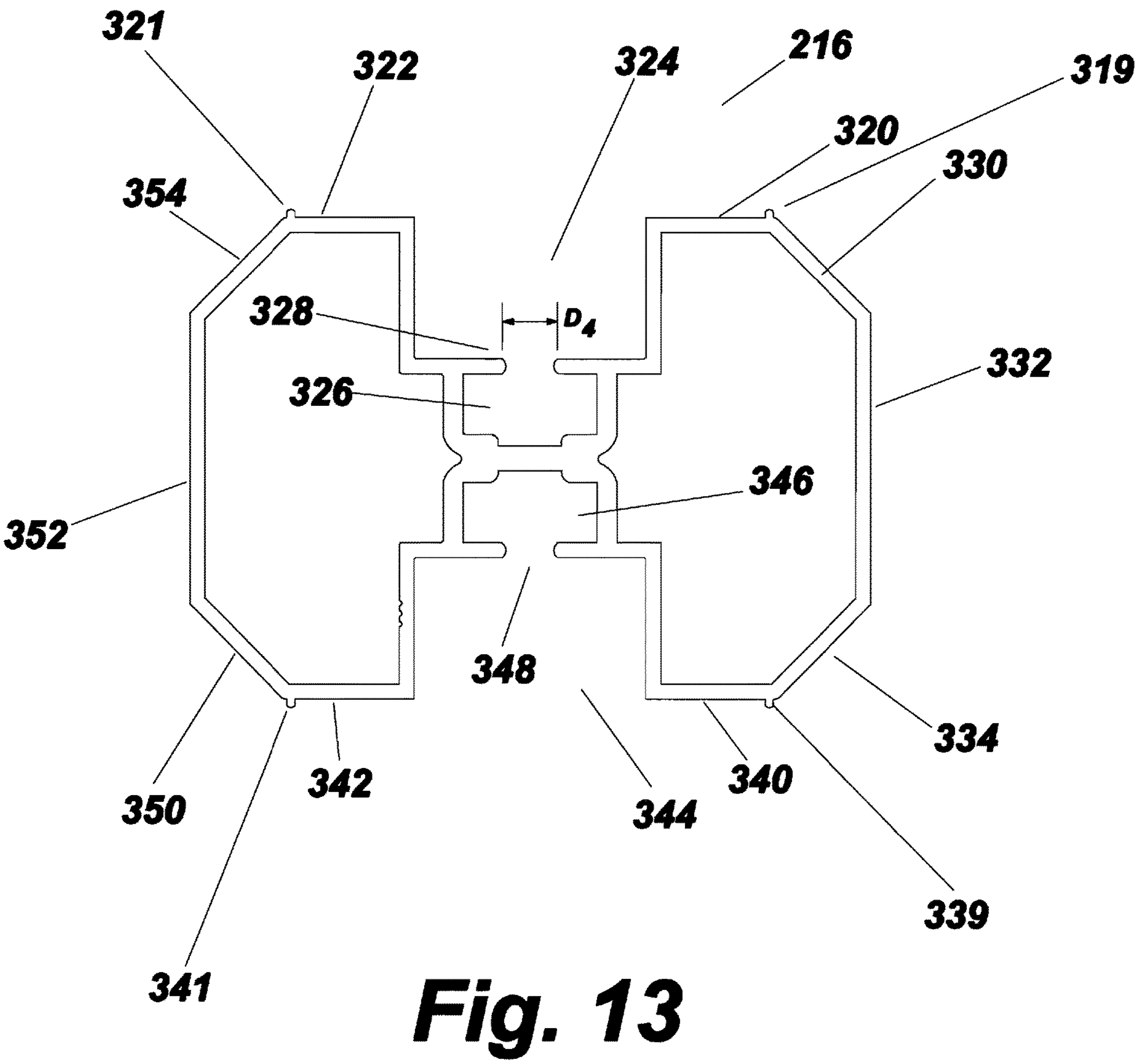
FIG. 13 is a cross-sectional view of the end arm of the first alternative embodiment.

Referring to FIG. 13, illustrated is the end gate arm 216 having a length of about 7 ft., which is slidably insertable into the cavity 315 of the base gate arm 214. In the preferred embodiment, the end gate arm 216 can be extended up to 5 ft. from the end of the extension gate arm 214, wherein two feet of the end gate arm 216 remains within the extension gate arm 214 for a proper foundation. The end gate arm 216 is defined by a first front wall 320 separated from a second front wall 322 by a front inset channel 324; the front inset channel 324 having a light-retaining channel 326 with a width of about 0.5 inches and a height of about 0.23 inches with an opening 328 having a spacing of about 0.188 inches. A first chamfer wall 330 is angled 45 degrees from the first front wall 320 to a first side wall 332. A second chamfer wall 334 is angled 45 degrees from the first side wall 332 to a first rear wall 340, which is separated from a second rear wall 342 by a rear inset channel 344; the rear inset channel 344 forming a mirror image of the front inset channel 324, and having a light-retaining channel 146 with an opening 348. A third chamfer wall 350 is angled 45 degrees from the second rear wall 342 to a second side wall 352. A fourth chamfer wall 354 is angled 45 degrees from the second side wall 352 to the first front wall 322.

Similar to the extension arm 214, a first spacer tab 319 is positioned on the outer edge of the first front wall 320 of the end arm 216; a second spacer tab 321 is positioned on the outer edge of the second front wall 322. A third spacer tab 339 is positioned on the outer edge of the first rear wall 340, and a fourth spacer tab 341 is positioned on the outer edge of the second rear wall 342. The spacer tabs positioned along the end arm 216 are constructed and arranged to slide within the extension arm 214 so as to center the end arm 216 in relation to the inner surface of the extension arm 214. The centering of the extension arm 214 protects the outer surfaces of the arm from scratching during storage, shipping and installation. This allows the factory placement of reflective tape or paint on the first and second front walls 320, 322, and the first and second rear walls 339, 341.

Figure 14:
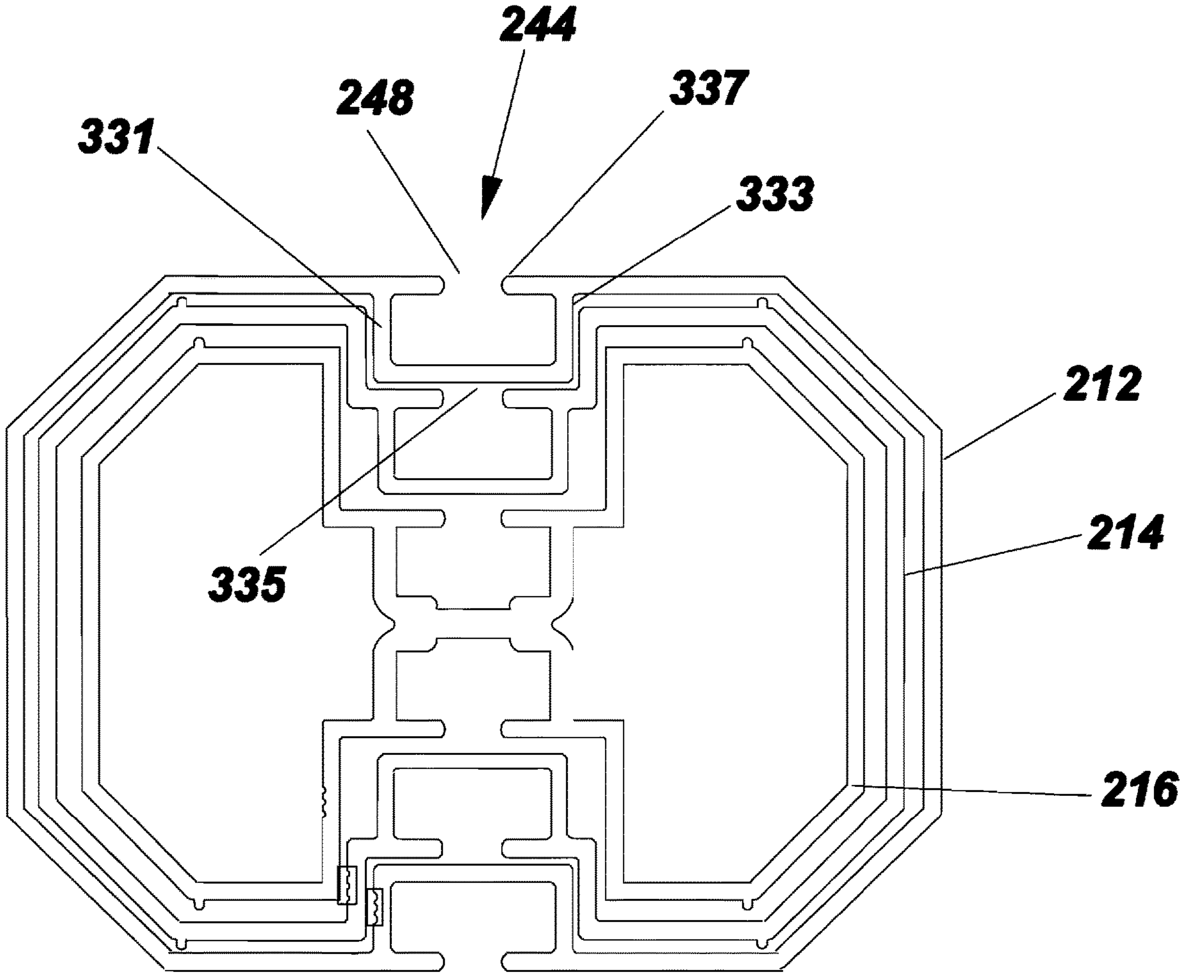
FIG. 14 is an end view of the nested gate arms of the first alternative embodiment.

Referring to FIG. 14, illustrated is an elongated inset channel 244 having an opening 248 formed by a pair of inset channel sidewalls 331, 333 integrally joined to a channel backwall 335. The inset channel walls 331, 333, including at least one terminating end 337 spaced from a sidewall 333 to form the opening 248. For ease of drawing readability, a single inset channel has been numbered, but it will be understood that all the inset channels for each arm are uniform. It is further noted that the terminating end 337 may extend from side wall 331, or extend from both channel sidewalls 331 and 333. For rigidity purposes, the backwall 347 of the end arm 216 operates for the front inset channel 324 and the rear inset channel 344.

Figure 15:
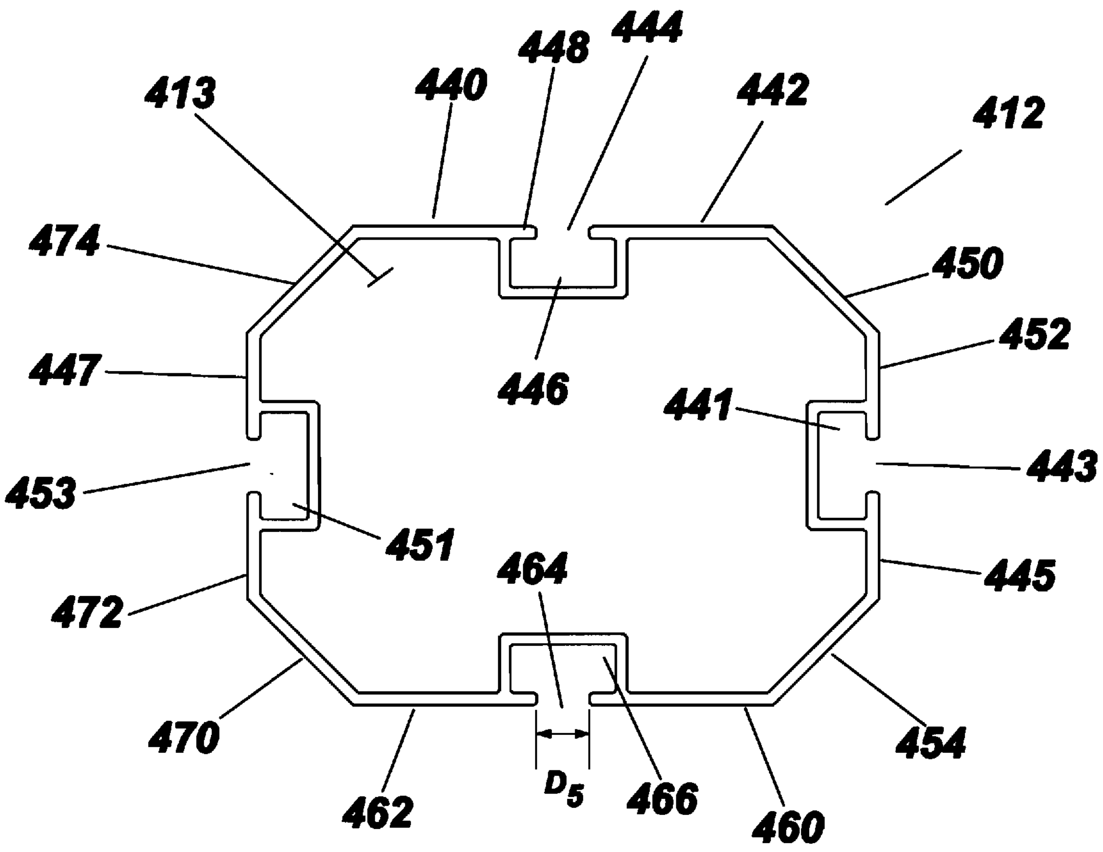
FIG. 15 a cross-sectional view of the base arm with a second alternative embodiment.

Referring to FIG. 15, set forth is another alternative embodiment wherein a base gate arm 412 is defined by a first front wall 440 separated from a second front wall 442 by a front inset channel 444; the front inset channel 444 having a light-retaining channel 446 with a width of about 0.5 inches and a height of about 0.23 inches with an opening 448 having spacing D4 of about 0.250 with the opening 448 centralized between the walls 440, 442. A light strip, as described in the previous embodiments, can be placed into the light-retaining channel 446 through the opening 448. A first chamfer wall 450 is angled 45 degrees from the second front wall 442 to a first side wall 452. A second receptacle 441 and inset channel 443 having the same shape and dimensions as the first receptacle 446 and front inset channel 444 can be used for receipt of a light strip, shown in the previous embodiments as light strip 350. A wall 445 leads to a second chamfer wall 454 angled 45 degrees from the side wall 445 to a first rear wall 460, and separated from a second rear wall 462 by a rear inset channel 464. The rear inset channel 464 forms a mirror image of the front inset chamber having spacing D5 of about 0.250 inches, having a light-retaining channel 466 of the same size and shape as the first inset channel 444 and light-retaining channel 446. A third chamfer wall 470 is angled 45 degrees from the second rear wall 462 to a second side wall 472. A third light-retaining channel 451 and inset channel 453 having the same shape and dimensions as the first light-retaining channel 446 and front inset channel 444 can be used for receipt of a light strip 350, shown in the previous embodiments. It should be noted that the receptacle and inset channels may also be used to support a rubber or plastic fender 606 to prevent damage to vehicles if the gates are prematurely closed. Side wall 447 leads to chamfer wall 474 angled at 45 degrees from the side wall 447 to the first front wall 440.

Figure 16:
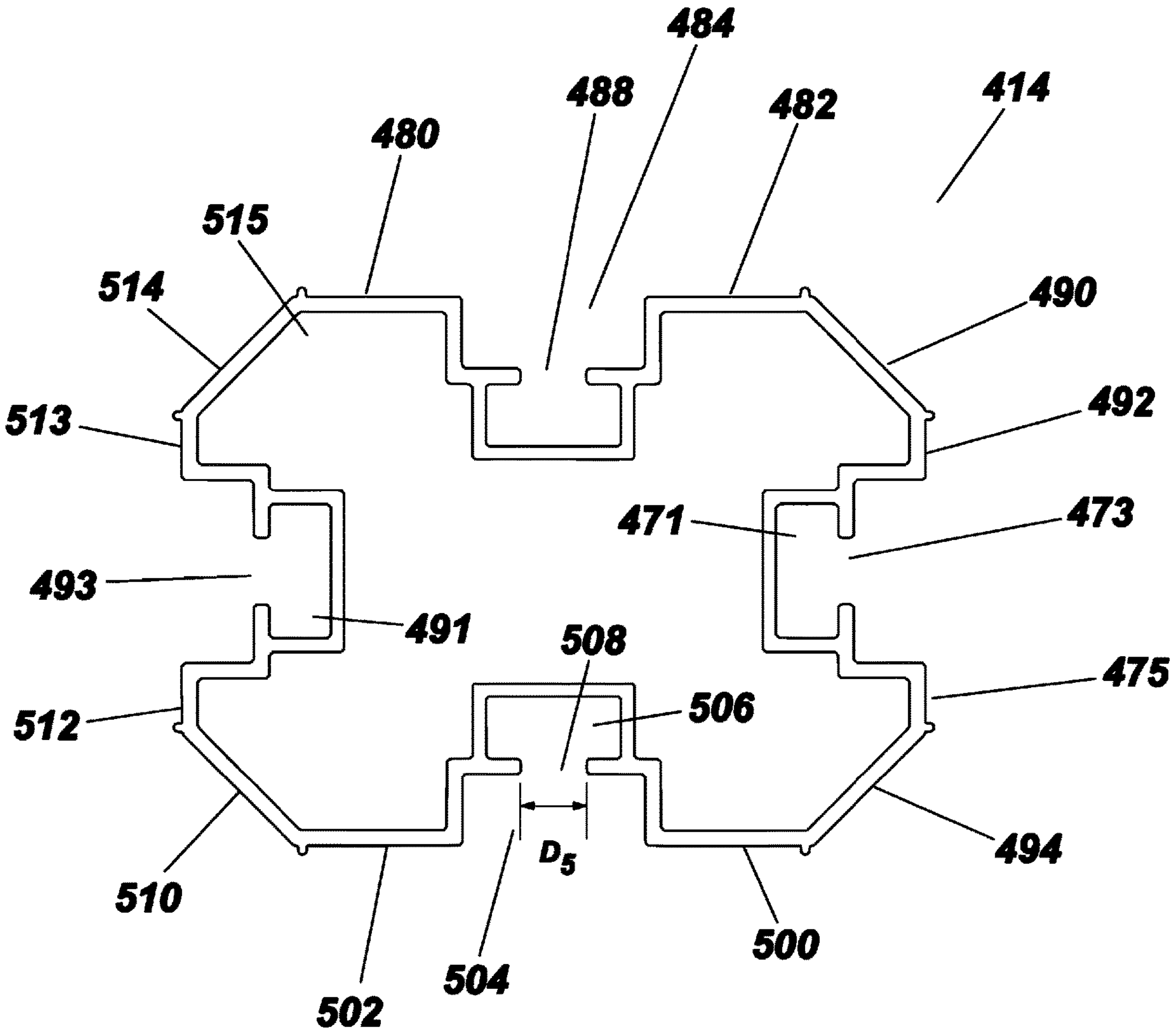
FIG. 16 is a cross-sectional view of the extension arm the second alternative embodiment.

Referring to FIG. 16, illustrated is the extension gate arm 414 having a length of about 7 ft., which is slidably insertable into the cavity 413 of the base gate arm 412. In the preferred embodiment, the extension gate arm 414 can be extended up to 5 ft. from the end of the base gate arm 412, wherein two feet of the extension gate arm remains within the base gate arm 412 for a proper foundation. The extension gate arm 414 is defined by a first front wall 480 separated from a second front wall 482 by a front inset channel 484; the front inset channel 484 having a light-retaining channel 486 with a width of about 0.5 inches and a height of about 0.23 inches with an opening 488 having a spacing of about 0.25 inches. A first chamfer wall 490 is angled 45 degrees from the second front wall 482 to a first side wall 492. A second light-retaining channel 471 and inset channel 473 having the same shape and dimensions as the first light-retaining channel 486 and front inset channel 488 can be used for receipt of a light strip, shown in the previous embodiments. A wall 475 leads to a second chamfer wall 494 angled 45 degrees from the side wall 475 to a first rear wall 500, and separated from a second rear wall 502 by a rear inset channel 504. The rear inset channel 504 forms a mirror image of the front inset chamber, having a light-retaining channel 506 of the same size and shape as the first inset channel 484 and light-retaining channel 486 with an opening 508. A chamfer wall 510 is angled 45 degrees from the rear wall 502 to side wall 512. A third light-retaining channel 491 and inset channel 493 having the same shape and dimensions as the first light-retaining channel 486 and front inset channel 488 can be used for receipt of a light strip 350, shown in the previous embodiments. Side wall 513 leads to chamfer wall 514 angled at 45 degrees from the side wall 513 to the front wall 480.

Figure 17:
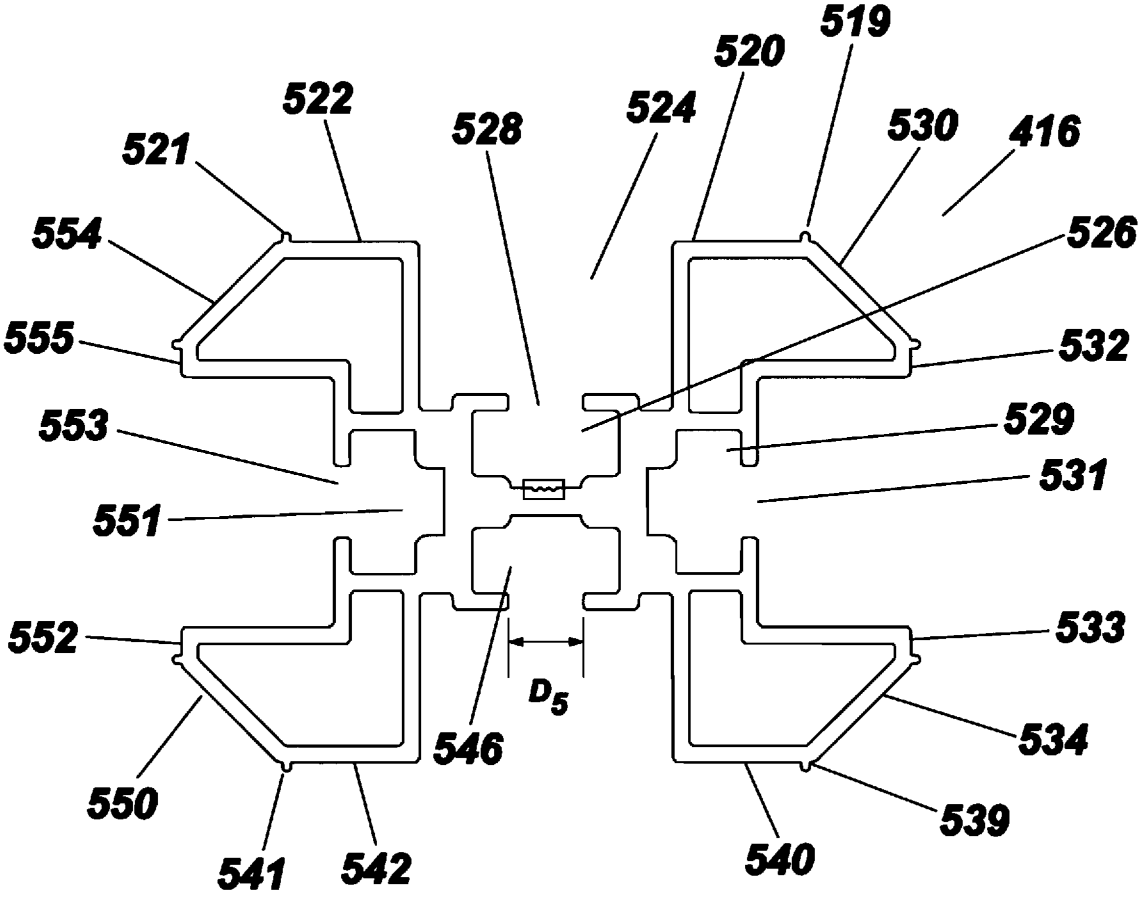
FIG. 17 is a cross-sectional view of the end arm of the second alternative embodiment.

Referring to FIG. 17, illustrated is the end gate arm 416 having a length of about 7 ft., which is slidably insertable into the cavity 515 of the base gate arm 414. In the preferred embodiment, the end gate arm 416 can be extended up to 5 ft. from the end of the extension gate arm 414, wherein two feet of the end gate arm 416 remains within the extension gate arm 414 for a proper foundation. The end gate arm 416 is defined by a first front wall 520 separated from a second front wall 522 by a front inset channel 524; the front inset channel 524 having a light-retaining channel 526 with a width of about 0.5 inches and a height of about 0.23 inches with an opening 528 having a spacing of about 0.188 inches. A first chamfer wall 530 is angled 45 degrees from the first front wall 520 to side wall 532. A second light-retaining channel 529 and inset channel 531 having the same shape and dimensions as the first light-retaining channel 526 and front opening 528 for receipt of a light strip 350 or fender 606 as described in the previous embodiments. A wall 533 leads to a second chamfer wall 534 angled 45 degrees from the side wall 533 to a first rear wall 540, and separated from a second rear wall 542 by a rear inset channel 546. Chamfer wall 550 is angled 45 degrees from the second rear wall 542 to a second side wall 552. A light-retaining channel 551 and inset channel 553 having the same shape and dimensions as the first light-retaining channel 526 and front opening 528 for receipt of a light strip 350 or fender 606 as described in the previous embodiments. Wall 555 leads to chamfer wall 554 angled 45 degrees from the side wall 555 to the first front wall 522.

Similar to the previous extension arms, spacer tab 519 is positioned on the outer edge of the first front wall 520; a second spacer tab 521 is positioned on the outer edge of the second front wall 522; third spacer tab 539 is positioned on the outer edge of the first rear wall 540, and a fourth spacer tab 541 is positioned on the outer edge of the rear wall 542. The spacer tabs positioned along the arms are constructed and arranged to slide within the extension arm so as to center the end arm in relation to the inner surface of the extension arm. The centering of the extension arms 4 protects the outer surfaces of the arm from scratching during storage, shipping and installation. This allows the factory placement of reflective tape or paint on the walls.

Figure 18:
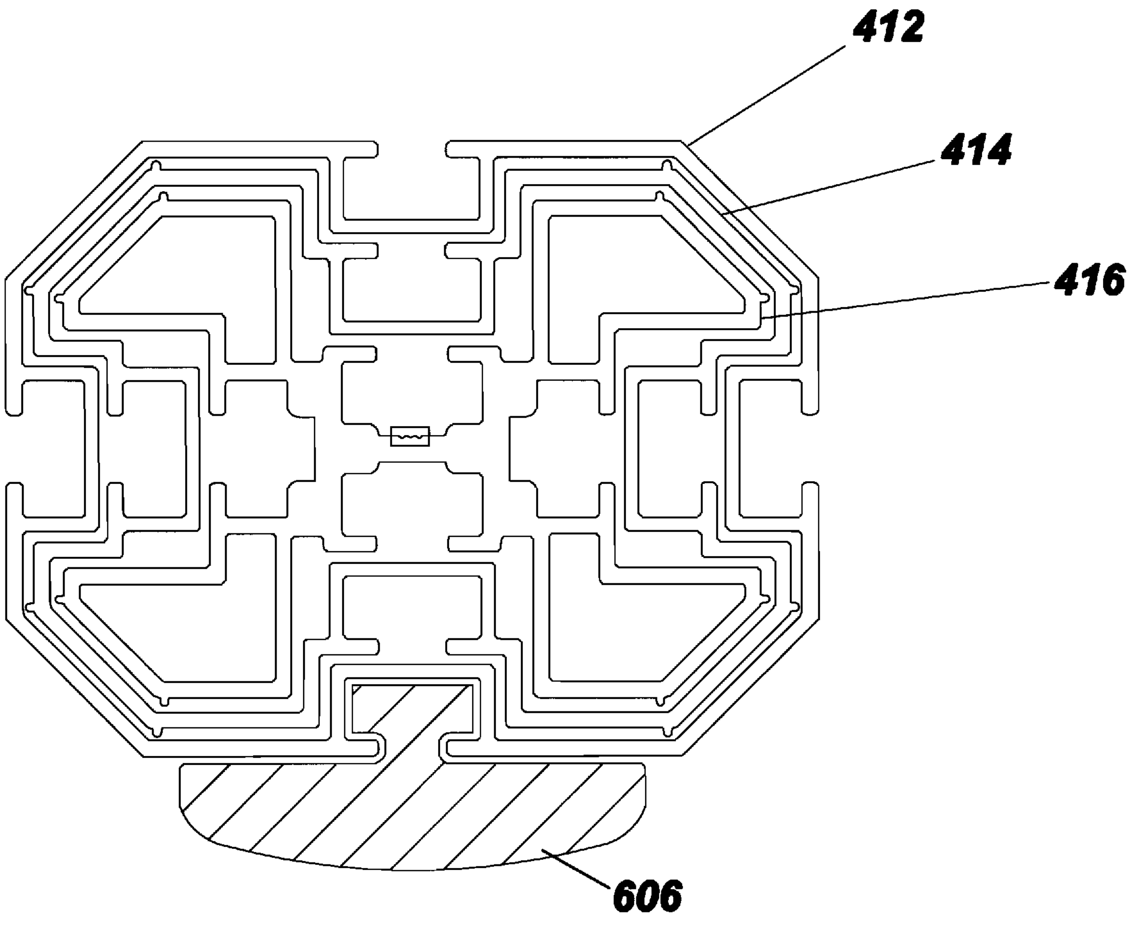
FIG. 18 is an end view of the nested gate arms of the second alternative embodiment.
Figure 19:
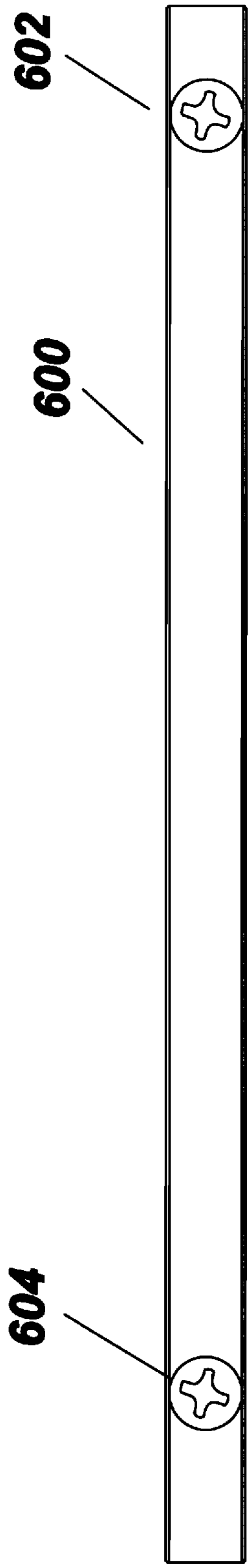
FIG. 19 is a plane view of the bar for securing arm sections.

Referring to FIG. 18, illustrated is an end view of the nested gate arms of the second alternative embodiment depicting the base arm 412, housing the extension arm 414 and the end arm 416. FIG. 19 depicts a bar 600 for use in securing arm sections 412, 414, and 416 together. In one embodiment the bar 600 is about 10 inches long with fasteners 602, 604 about 8 inches apart. The bar 600 is placed within one of the light-retaining channels, such as light-retaining channel 486, for concealment.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more elements, but is not limited to possessing only those one or more elements. Furthermore, a device or structure that is configured in a certain way is configured in at least that way, but may also be configured in ways that are not listed.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

What is claimed is:

1. A telescopic vehicle barrier gate arm comprising:

a first gate arm portion defined by an exterior wall having a length, said exterior wall having an outer surface and an inner surface, said first gate arm portion having an internal space defined by said inner surface of said exterior wall, said first gate arm portion having at least one light-retaining channel extending along said length, said at least one light-retaining channel extending inwardly from said exterior wall, said at least one light-retaining channel having a height and configured to receive a light strip, said at least one light-retaining channel including at least one light-retaining wall extending only partially said height of said light-retaining channel;

a second gate arm portion defined by an exterior wall having a length, said exterior wall having an outer surface and an inner surface, said second gate arm portion having internal space defined by said inner surface of said exterior wall, said second gate arm portion having an at least one light-retaining channel extending along said length, said at least one light-retaining channel extending inwardly from said exterior wall, said at least one light-retaining channel having a height and configured to receive a light strip, said at least one light-retaining channel including at least one light-retaining wall extending only partially said height of said light-retaining channel;

said second gate arm portion sized to fit within said internal space of said first gate arm portion; and a light strip which is removably retained within said light retaining channel of said first gate arm portion and said light retaining channel of said second gate arm portion such that light from said light strip is visible through each said light retaining channel.

2. The telescopic vehicle barrier gate arm of claim 1, wherein said second gate arm portion exterior wall outer surface further includes at least one wall extending outward from said outer surface.

3. The telescopic vehicle barrier gate arm of claim 1, wherein the first gate arm portion and second gate arm portion attachment portions are corresponding apertures constructed and arranged that fastener can be used to couple said first gate arm portion and said second gate arm portion.

4. The telescopic vehicle barrier gate arm of claim 1, wherein said second gate arm portion having at least one light-retaining channel constructed and arranged to align with said first gate arm portion and a first light-retaining channel.

5. The telescopic vehicle barrier gate arm of claim 1, further including a third gate arm portion defined by an exterior wall having a length, said exterior wall having an outer surface and an inner surface, said third gate arm portion having an internal space defined by said inner surface of said exterior wall, said third gate arm portion having at least one light-retaining channel extending along said length, said at least one light-retaining channel extending inwardly from said exterior wall, said at least one light-retaining channel having a height and configured to receive a light strip, said at least one light-retaining channel including at least one light-retaining wall extending only partially said height of said light-retaining channel, said third gate arm portion sized to fit within said internal space of said second gate arm portion, a proximal end of said third gate arm portion including an attachment portion on said exterior wall of said third gate arm portion, and a distal end of said second gate arm portion including an attachment portion on said exterior wall of said second gate arm portion.

6. The telescopic vehicle barrier gate arm of claim 5, wherein said third gate arm portion exterior wall outer surface further includes at least one spacer wall extending outward from said outer surface.

7. The telescopic vehicle barrier gate arm of claim 5, wherein the second gate arm portion and third gate arm portion attachment portions are constructed and arranged to receive a fastener to couple said second gate arm portion to said third gate arm portion in a fixed position.

8. The telescopic vehicle barrier gate arm of claim 5, wherein said third gate arm portion has at least one light-retaining channel constructed and arranged to align with said second gate arm portion at least one light-retaining channel.

9. The telescopic vehicle barrier system of claim 1 wherein each side wall includes a 45 degree angled corner forming an octagon shaped gate arm.

10. The telescopic vehicle barrier system of claim 1 including a controller electrically coupled to said light strip wherein an N number of light emitting diodes comprise one color and an N number of light emitting diodes comprise another color.

11. A telescopic vehicle barrier system comprising:

a first gate arm having a first continuous side wall forming a cavity therein, said first side wall including a first elongated light-retaining channel having an opening formed along a longitudinal axis of said first gate arm;

a second gate arm having a second continuous side wall slidably insertable into said first cavity of said first gate arm, said second continuous side wall forming a second cavity therein, said second side wall including a second elongated light-retaining channel having an opening formed along a longitudinal axis of said second gate arm;

a third gate arm having a third continuous side wall slidably insertable into said second cavity of said second gate arm, said third side wall including a third elongated light-retaining channel having an opening formed along a longitudinal axis of said second gate arm;

a light strip which is removably retained within said elongated light-retaining channel of said first, second and third gate arms such that light from said light strip is visible through the light-retaining channels.

12. The telescopic vehicle barrier according to claim 11 including a controller to selectively pivot said gate arm between a horizontal position and a vertical position.

13. The telescopic vehicle barrier according to claim 11 wherein each said arm includes at least one elongated light-retaining channel formed along a longitudinal axis of said arm, said elongated light-retaining channel having an opening formed by a pair of inset channel sidewalls integrally joined to a channel backwall, said light-retaining channel walls including at least one upper terminating end spaced from a sidewall to form an opening.

14. The telescopic vehicle barrier according to claim 11 wherein said light strip is formed from a plurality of light emitting diodes, each electrically connected in parallel and physically disposed adjacent one another in series, and encased within a protective member, said light strip cradled within said elongated light-retaining channel between said backwall and said inset channel sidewalls and retained therein by said terminating end; wherein said light strip is positioned within said elongated light-retaining channel with said plurality of light emitting diodes aligned towards said opening such that light from said plurality of light emitting diodes projects through said opening.

15. The telescopic vehicle barrier system of claim 11 further comprising a second elongated light-retaining channel formed along said longitudinal axis of each said gate arm at a position 180 degrees from the first elongated light-retaining channels, said second elongated light-retaining channel forming a mirror image of said first elongated light-retaining channel.

16. The telescopic vehicle barrier system of claim 11 including a controller electrically coupled to said light strip wherein an N number of light emitting diodes comprise one color and an N number of light emitting diodes comprise another color.

17. The telescopic vehicle barrier system of claim 11 wherein said light emitting diodes are coupled to a high-intensity LED flasher unit capable of outputting a luminescence at about 60 flashes per minute.

18. The telescopic vehicle barrier system of claim 11 wherein said gate arm is constructed from aluminum.

19. The telescopic vehicle barrier system of claim 11 including spacer tabs.

20. The telescopic vehicle barrier system of claim 11 wherein each side wall includes a 45 degree angled corner forming an octagon shaped gate arm.

21. The telescopic vehicle barrier system of claim 11 wherein said gate arms are extendable from about 7 ft long to about 17 foot long with said light strip extending therebetween.

* * * * *